United States Patent Office 3,428,448
Patented Feb. 18, 1969

3,428,448
PROCESS FOR REDUCING METAL COMPOUNDS
Shelton Bank, Westfield, Elliot Vogelfanger, Metuchen, Lars A. Naslund, Roselle Park, and David J. C. Yates, Westfield, N.J., assignors to Esso Research and Engineering Company, a corporation of Delaware
No Drawing. Filed July 20, 1965, Ser. No. 473,511
U.S. Cl. 75—108          6 Claims
Int. Cl. C22b 57/00, 55/00, 53/00

ABSTRACT OF THE DISCLOSURE

Heavy metal salts are reduced to the corresponding heavy metals by reaction with a light metal, using as the reaction medium a basic organic dipolar nitrogen or phosphorous compound which has the dielectric constant of at least 6 which is devoid of active hydrogen atoms and hydroxyl groups.

---

This invention relates to a process for producing active metals in finely divided form. More particularly, the invention relates to a process for the reduction of heavy metal compounds by reacting a heavy metal compound with a solution of a light metal or a light metal addition compound in a solvent selected from a group of solvents which greatly enhance the formation of radical anion reducing agents.

The highly active, finely divided metals produced by the process of the invention are useful as catalysts and as alloys. In one embodiment, the reduction reaction is applied to spent catalysts for the purpose of regeneration.

U.S. Patent 2,177,412 issued Oct. 24, 1939, discloses reductions of heavy metals with solutions of alkali metals in ether solvents. While the prior art reducing mediums are satisfactory for some reduction reactions, they are unsatisfactory for others because of slow rates of reaction and instability of the solvents.

The object of this invention is to provide an improved method for reducing heavy metal compounds employing moderate conditions in a stable reaction medium having a very high reduction potential. Another object of the invention is to apply the reduction reaction of the invention to the preparation and regeneration of catalysts where the metal is in a free state or deposited on a catalyst support.

We have found that certain compounds having particular chemical and physical characteristics are superior donor solvents for the preparation of radical anion reduction systems in which a light metal ion is solvated.

The term light metal is employed in this disclosure to embrace the alkali metals, i.e. lithium, sodium, potassium, rubidium and cesium as well as the alkaline earth metals, i.e. magnesium, calcium, strontium and barium. Preferred light metals include sodium, lithium, calcium and barium.

The solvent of this invention comprises a compound containing a carbon atom, with at least one functional group containing an atom selected from the group consisting of nitrogen and phosphorus. The solvent should be aprotic, that is to say there should be no available reactive hydrogen atoms present. It must be dipolar, nonhydroxylic, and preferably the solvent should be soluble under reaction conditions and have a high dielectric constant, i.e. over 6.

As to the nitrogen-containing functional groups, the substituted urea compounds are especially active as solvents for the displacement reaction referred to above. In keeping with the general requirement that the solvents be aprotic, the nitrogen atoms are fully substituted, i.e. contain no active hydrogen. These ureas may be described by the following chemical formula:

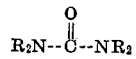

wherein the R groups may comprise the same or different nonolefinic hydrocarbon radicals either alkyl, cycloalkyl, aryl, alkaryl or aralkyl. Typical ureas include tetramethyl urea, tetraethyl urea, tetraphenyl urea, tetracyclohexyl urea, N,N-dimethyl-N',N'-diethyl urea, N,N'-dimethyl ethylene urea, N,N'-diphenyl ethylene urea, N,N-diphenyl-N',N'-dimethyl urea, tetraisobutyl urea, tetraallyl urea, and the like.

Included in the urea category are the thioureas described by the formula:

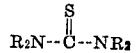

wherein R is a hydrocarbon radical as defined above, which include as examples the following: tetramethyl thiourea, tetraethyl thiourea, tetraphenyl thiourea, N,N-diethyl-N',N'-diamylthiourea, N,N'-dimethyl ethylene thiourear, N,N'-diphenyl ethylene thiourea, tetraallyl thiourea.

Various substituted amides such as N,N-dimethyl formamide, N,N-diphenyl formamide, N,N-ethyl phenyl formamide, N,N-dimethyl acetamide, N,N-dimethyl valeramide, tetramethyl adipamide, tetramethyl phthalamide, are also valuable solvents for the present purposes.

As to the phosphorous-containing functional groups, there are included tertiary phosphines ($R_3P$), tertiary phosphine oxides ($R_3PO$), tertiary phosphites $(RO)_3P$, tertiary thiophosphites $(RS)_3P$, tertiary phosphates $$(RO)_3PO$$

tertiary thiophosphates $(RS)_3PO$, where R is as defined above.

Examples of these phosphorous derivatives follow.

Tertiary phosphines.—Trimethylphosphine, triethylphosphine, triamylphosphine, tricyclohexylphosphine, tricyclopentylphosphine, tridodecylphosphine, triphenylphosphine, tri-p-toluylphosphine, dimethylethylphosphine, didecylmethylphosphine, diphenylbutylphosphine, methylethylbutylphosphine, propylphenylcyclohexylphosphine, tri-o-chlorophenylphosphine, tri-p-N,N-dimethyl analino phosphine, tri-o-methoxyphenylphosphine.

Tertiary phosphine oxides.—Trimethylphosphine oxide, triethylphosphine oxide, trihexylphosphine oxide, tridecylphosphine oxide, tricyclohexylphosphine oxide, tricyclopentylphosphine oxide, triphenylphosphine oxide, tri-α-naphthylphosphine oxide, dimethylethylphosphine oxide, diphenylbutylphosphine oxide, methylethylbutylphosphine oxide, tri-o-chlorophenylphosphine oxide, tri-o-methoxyphenylphosphine oxide.

Tertiary phosphites.—Trimethylphosphite, triethylphosphite, trihexylphosphite, diethylmethylphosphite, tricyclohexylphosphite, tricyclopentylphosphite, triphenylphosphite, tri-p-toluylphosphite, tri-o-chlorophenylphosphite, tri-o-methoxyphenylphosphite, dihexylbutylphosphite, triallylphosphite.

Tertiary thiophosphites.—Trimethylthiophosphite, triethylthiophosphite, tridecylthiophosphite, tricyclohexylthiophosphite, triphenylthiophosphite, tri-p-toluylthiophosphite, diphenylmethylthiophoshite, triallylthiophosphite.

Tertiary phosphates. — Trimethylphosphate, triethylphosphate, tributylphosphate, tridecylphosphate, tricyclohexylphosphate, triphenylphosphate, dibutylmethylphosphate, diphenylmethylphosphate, triallylphosphate.

Tertiary thiophosphates.—Trimethylthiophosphate, triethylthiophosphate, triphenylthiophosphate, dibutylmethylthiophosphate, triallylthiophosphate.

Another variety of phosphorous-containing functional groups include the amides of phosphorous acids such as the amides of tertiary phosphorous acids $(R_2N)_3P$, the amides of tertiary phosphoric acid $(R_2N)_3PO$, examples of which follow:

N,N',N'' hexaalkyl amides of tertiary phosphorous acids.—Hexamethyl phosphorous triamide, hexaethyl phosphorous triamide, hexadodecyl phosphorous triamide, hexaphenyl phosphorous triamide, N,N-dimethyl-N',N'-diethyl-N'',N''-diphenyl phosphorous triamide, hexacyclohexyl phosphorous triamide, hexaallyl phosphorous triamide.

N,N',N'' hexaalkyl amides of tertiary phosphoric acids.—Hexamethyl phosphoric triamide, hexaethyl phosphoric triamide, hexadodecyl phosphoric triamide, hexaphenyl phosphoric triamide, N,N-dimethyl-N',N'-diethyl-N'',N''-didodecyl phosphoric triamide (hexaalkylphosphoramide), phosphoric triamide, hexacyclohexyl phosphoric triamide, hexaallyl phosphoric triamide.

Other miscellaneous derivatives of phosphorous-containing functional groups include the following: triphenylphosphine-ethylidenimine, trimethylphosphine-phenylidenimine, N,N-dipropylphosphinamide, N,N-diphenylphosphinamide, N,N,N',N'-tetraethyl-benzene phosphondiamide, N,N,N',N'-tetramethylbenzene-thionophosphondiamide, ethyl N-methylimidophosphite, phenyl N-ethylimidophosphate, trimethylthio-thionophosphate.

Thus, it can be seen that the solvent employable herein may be characterized as hydrocarbon substituted compounds containing a functional radical selected from the group consisting of

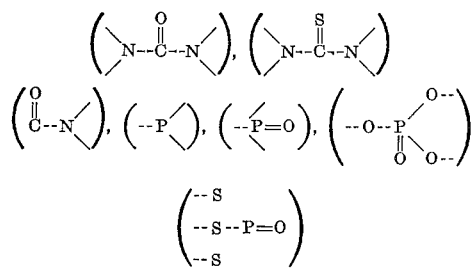

wherein the open bonds are attached to hydrocarbon radicals.

In particular, the hydrocarbon substituted trialkyl phosphates, tetraalkyl ureas, the polyalkylated phosphoramides, and the dialkyl formamides, wherein the alkyl groups of the aforementioned compounds contain from 1–8 carbon atoms are preferred.

The solvents of the invention can be used in conjunction with conventional solvents such as ethers, amines and amino ethers.

The light metal is added to the solvent in metallic form or as an organo addition compound.

The light metal is preferably added to the solvent in the form of an addition compound with an aromatic hydrocarbon, preferably a polycyclic aromatic hydrocarbon such as naphthalene, anthracene, phenanthrene and biphenyl.

The addition compound can be prepared by conventional methods such as by adding the metal in finely divided form to the organic material in the presence of an accelerating solvent. Such preparations of light metal addition compounds are disclosed by G. E. Coates in the text "Organo-Metallic Compounds," published in 1960 by Wiley and Sons, at pages 32–34 and references cited therein.

While the specification indicates that the addition compound is "dissolved" in the "solvent" to form a "solution," it should be understood that the exact physical and chemical phenomenon which take place upon adding the alkali metal to the dipolar aprotic solvent may not be wholly in accord with the conventional use of such terminology. For example, while the fundamental nature of the alkali metal phosphoramide solutions is not experimentally known, the following mechanism is proposed. The phosphorus in the P=O bond may accept an electron in its d-orbital. Thus, with easily ionizable materials such as the alkali metals, a situation may arise where the alkali metal ionizes and the electron is effectually "solvated" by the solvent. Preliminary electron spin resonance studies show that this may be happening. The metal cation, in turn, may be solvated by bonding to the oxygen function.

The solubility of the alkali metals in 100 cc. hexamethyl-phosphoramide at ambient temperature, e.g. 76° F. is shown in the following table.

TABLE I

| Alkali metal: | Grams at saturation |
|---|---|
| Li | 1.7 |
| Na | 1.2 |
| K | 3.0 |
| Rb | >0.1 |

The amount of alkali metal which is dissolved in the solvent of this invention may vary, however, it is preferable to use a solution which is saturated at the particular reaction temperature.

The process of the present invention can be used to reduce heavy metals having a reduction potential of less than 1.75 volts in the metal-metal ion. The term heavy metals as it is used in this specification includes metals of Groups III–B, IV–B, VI–B, VII–B, VIII–B, I–B, II–B, III–A, IV–A, and V–A of the Periodic Table (Frey, College Chemistry, Second Edition, 1958). Binary or multi-component mixtures of metals can be used to produce alloys or multi-component catalysts. The reduction of compounds selected from the group consisting of nickel, zinc, platinum, palladium, cobalt, iron, chromium, copper, mercury, cadmium, lead, silver and tin are preferred reactions.

The metals are added to the reaction mixture as anhydrous metal salts. The salts can be inorganic salts or organic salts. Preferred inorganic salts include the halides, sulfates, sulfides, oxides, nitrates, nitrites, carbonates, bisulfates, bi-sulfites and phosphates. Preferred organic salts include salts of carboxylic acids having 1–8 carbon atoms in the molecule, such as the acetates and proprionates as well as metal alkyls, metal aryls, metal alcoholates, etc.

The reaction is carried out at temperatures ranging from −80 to +100° C., preferably from 10 to 40° C. The most preferred temperature is ambient temperature; pressure is not critical. Pressures ranging from 0 to 500 p.s.i.a. are suitable and atmospheric pressure is preferred.

The reduction reaction is carried out in an oxygen free atmosphere with stirring. Ordinary glass laboratory equipment is suitable. In a typical procedure from 200 to 2000 ml. of solvent is added to a nitrogen flushed glass reactor. From 5 to 50 wt. percent of light metal addition compound, based on the solvent, is added with stirring. Next, the heavy metal compound is added and the reaction proceeds at ambient temperature. After a period ranging from several minutes to several hours the reaction is terminated by the addition of methanol and the heavy metal reduction product is separated by centrifuging or by other separation means.

The following examples illustrate the process. In all cases, the pressure was atmospheric pressure and the reaction mixture was stirred with a motor driven stirrer. Reaction times ranged from 10 minutes to 2 hours.

EXAMPLE 1

Nickel acetate (0.884 g.) was reacted with the sodium naphthalene radical anion prepared from 0.345 g. of sodium and 1.92 g. of naphthalene in 50 cc. of hexamethylphosphoramide. After workup with methanol a finely divided nickel metal (0.2935 g.) was isolated by centrifugation. The material was catalytically active for the hydrogenation of 1-octene (50% conversion in 12 minutes).

EXAMPLE 2

Nickel acetate (1.876 g.) in 100 cc. of hexamethylphosphoramide was reacted with 0.25 g. of lithium for 20 hours at 10° C. After workup with methanol 0.647 g. of a nickel powder was obtained that was active for the hydrogenation of 1-octene (50% conversion in 6 minutes).

EXAMPLE 3

In a small reaction flask under a nitrogen blanket, sodium (1.15 g.) and zinc chloride (2.0 g.) were reacted in 50 cc. of tetramethylurea at room temperature. The metallic zinc was separated by centrifugation and washed successively with benzene, acetone and ether. The final black powder was dried in an oxygen free atmosphere. The powder was converted to the oxide by air oxidation—1.10 g. oxide product.

EXAMPLE 4

Magnesium (0.60 g.) was reacted with 9.10 g. of benzophenone in 50 cc. of N,N-dimethylformamide at room temperature in an inert atmosphere. Cobalt chloride (3.25 g.) was added and after workup with methanol, 0.83 g. of a cobalt powder was obtained.

EXAMPLE 5

Strontium (1.73 g.) and naphthalene (5.12 g.) were reacted in 50 cc. of N,N-dimethylformamide at room temperature in an inert atmosphere. Cobalt chloride (1.30 g.) was added and after workup with methanol and centrifugation a highly magnetic cobalt powder (0.83 g.) with particle size less than 100 A. was obtained.

EXAMPLE 6

Lithium metal dispersion (0.70 g., 0.35 g. of lithium) and 6.4 g. of naphthalene were reacted in 50 cc. of tetramethylurea at room temperature in a nitrogen atmosphere. Cuprous chloride (2.0 g.) was added and after 3 hours methanol was added to quench. After centrifugation 1.22 g. (95% yield) of finely powdered copper metal was obtained.

EXAMPLE 7

In a small flask under a nitrogen blanket sodium (1.15 g.) naphthalene (6.4 g.) and platinum chloride (PtCl$_4$) 1.00 g. were mixed in 50 cc. of tetramethylurea. Degassed methanol was added to quench the reaction and after centrifugation 0.65 g. of finely divided platinum was obtained. The platinum metal was an active catalyst for methanol oxidation.

EXAMPLE 8

In a small reaction flask under a nitrogen blanket 1.15 g. of sodium and 1.00 g. of platinum chloride (PtCl$_4$) were reacted in 50 cc. of tetramethylurea at room temperature. Degassed methanol was added to quench and after centrifugation there was obtained 0.64 g. of finely divided platinum. The platinum was an active cataylst for methanol oxidation.

EXAMPLE 9

Calcium (1.0 g.) and benzophenone (9.1 g.) were reacted in 50 cc. of tetramethylurea in an inert atmosphere at room temperature. Cobalt chloride (3.25 g.) was added and after two hours the reaction mixture was quenched with methanol and the solid separated by centrifugation. A highly magnetic cobalt powder (0.6 g.) was obtained.

EXAMPLE 10

Example 9 was repeated using 50 cc. of N,N-dimethylformamide instead of tetramethylurea and like amounts of other reagents and conditions (0.01 g.) cobalt powder were obtained.

EXAMPLE 11

Strontium (1.1 g.) and benzophenone (4.6 g.) were reacted in 50 cc. of tetramethylurea at room temperature in an inert atmosphere. To the resulting dark blue solution 3.25 g. of cobalt chloride was added. The reaction mixture was quenched with methanol and the solid separated by centrifugation. A highly magnetic cobalt powder (.03 g.) was obtained.

EXAMPLE 12

In a small reaction flask under a nitrogen blanket, sodium (1.15 g.), naphthalene (6.4 g.) and chromium acetate (2.47 g.) were reacted in 50 cc. of tetramethylurea at room temperature. The finely divided black chromium was separated by centrifugation and washed successively with benzene, acetone and ether. The final powder was dried in an oxygen free atmosphere.

EXAMPLE 13

In a small reaction flask under a nitrogen blanket, sodium (1.5 g.), naphthalene (6.4 g.) and ferric chloride (2.44 g.) were reacted in 50 cc. of tetramethylurea at room temperature. The finely divided iron powder was separated by centrifugation and washed successively with benzene, acetone and ether and dried in an oxygen free atmosphere.

EXAMPLE 14

In a small reaction flask under a nitrogen blanket sodium (1.15 g.), cuprous chloride (1.00 g.) and nickel chloride (1.287 g.) were reacted in 50 cc. of tetramethylurea at room temperature. Degassed methanol was added and the finely divided copper-nickel alloy (1.10 g.) separated by centrifugation.

EXAMPLE 15

In a small reaction flask under a nitrogen blanket sodium (1.15 g.), naphthalene (6.4 g.), nickel chloride (1.287 g.) and cuprous chloride (1.00 g.) were reacted in 50 cc. of tetramethylurea at room temperature. Degassed methanol was added and the solid was separated by centrifugation. In this way a finely divided copper-nickel alloy (1.05 g.) was obtained.

EXAMPLE 16

A sample (1.0 g.) of nickel and silica was reduced with lithium (0.59 g.) and biphenyl (6.17 g.) in tetramethylurea 100 cc. at room temperature in a nitrogen atmosphere. After workup with methanol this material was shown to be catalytically active for the hydrogenation of 1-octene at room temperature and atmospheric pressure (50% conversion in 13 minutes).

The catalyst was recovered, treated with thiophene and washed with methanol. The sulfided catalyst was then catalytically inert for the hydrogenation of 1-octene.

1.0 g. of the nickel-silica was reduced with lithium (0.5 g.) and biphenyl (6.17 g.) in 100 cc. of tetramethylurea under nitrogen.

The regenerated catalyst was active for the hydrogenation of 1-octene.

The examples show that the group of solvents disclosed provide an improved medium for the formation of radical anion agents for use in the reduction of heavy metal compounds to metals.

What is claimed is:

1. A process for reducing a heavy metal salt to the free metal which comprises reacting said salt with a light metal or addition compound thereof in an organic liquid solvent medium consisting essentially of a basic dipolar compound of nitrogen or phosphorous having a dielectric constant of at least 6 and which is devoid of active hydrogen atoms and hydroxyl groups.

2. A process according to claim 1 in which the solvent medium is a tertiary phosphate ester, a tetraalkyl urea, an N,N-di-alkyl amide, or a hexaalkyl amide of a tertiary phosphorus acid.

3. A process according to claim 1 in which the solvent medium is hexamethyl phosphoramide, N,N-dimethylformamide, or tetramethylurea.

4. A process according to claim 1 in which the reaction temperature is in the range of −80° to +100° C.

5. A process according to claim 1 in which said light metal is an alkali metal or an alkaline earth metal.

6. A process according to claim 1 in which the heavy metal is a metal of Group III–B, IV–B, V–B, VI–B, VII–B, VIII–B, I–A, II–A, III–A, IV–A, or V–A of the Periodic Table.

References Cited

UNITED STATES PATENTS

| | | | |
|---|---|---|---|
| 2,177,412 | 10/1939 | Scott et al. | 252—472 X |
| 2,716,057 | 8/1955 | Whaley | 75—0.5 |
| 2,787,540 | 4/1957 | Appell | 252—472 X |
| 3,102,808 | 9/1963 | Weisberg et al. | 75—119 X |
| 3,265,634 | 8/1966 | Schultz et al. | 252—214 |
| 3,330,815 | 7/1967 | McKeon et al. | 252—472 X |
| 3,336,133 | 8/1967 | Funatsu et al. | 75—119 |

DANIEL E. WYMAN, *Primary Examiner.*

CARL F. DEES, *Assistant Examiner.*

U.S. Cl. X.R.

75—117, 119, 121; 252—414